(12) United States Patent
Morikawa et al.

(10) Patent No.: US 7,069,005 B2
(45) Date of Patent: Jun. 27, 2006

(54) METHOD FOR ANALYZING SIGNAL AND SIGNAL ANALYZER HAVING FUNCTION FOR DISPLAYING SLOT INFORMATION

(75) Inventors: Takayuki Morikawa, Yokohama (JP); Katsuhisa Iiyoshi, Kawasaki (JP); Yuji Kanno, Tokyo (JP); Hideo Zuinen, Atsugi (JP)

(73) Assignee: Anritsu Corporation, Tokyo (JP)

( * ) Notice: Subject to any disclaimer, the term of this patent is extended or adjusted under 35 U.S.C. 154(b) by 324 days.

(21) Appl. No.: 10/381,955

(22) PCT Filed: Jul. 5, 2002

(86) PCT No.: PCT/JP02/06855

§ 371 (c)(1),
(2), (4) Date: Mar. 31, 2003

(87) PCT Pub. No.: WO03/013035

PCT Pub. Date: Feb. 13, 2003

(65) Prior Publication Data

US 2004/0059546 A1 Mar. 25, 2004

(30) Foreign Application Priority Data

Aug. 1, 2001 (JP) .............................. 2001-233882

(51) Int. Cl.
*H04Q 7/20* (2006.01)
(52) U.S. Cl. .................... 455/423; 455/67.11; 455/67.7
(58) Field of Classification Search ........ 455/423–425, 455/522–523, 67.11–67.14, 67.16, 68, 69, 455/115.1–115.4, 226.1–226.4
See application file for complete search history.

(56) References Cited

U.S. PATENT DOCUMENTS 5,825,817 A 10/1998 Tanaka et al.
6,496,705 B1 * 12/2002 Ng et al. .................... 455/502

(Continued)

FOREIGN PATENT DOCUMENTS

| JP | 7-298245 A | 10/1955 |
| JP | 62-135029 A | 6/1987 |
| JP | 8-37488 A | 6/1996 |
| JP | 2002-261684 A | 9/2002 |

OTHER PUBLICATIONS

Specialized Products Company, Fall 1995 catalog, pp. 154-155.*

*Primary Examiner*—Duc Nguyen
(74) *Attorney, Agent, or Firm*—Frishauf, Holtz, Goodman & Chick, P.C.

(57) ABSTRACT

A measuring section measures a digital multiplex signal divided into slot units, as a signal to be measured. A display control section displays, on a screen, a measured waveform of the signal. An analyzing section analyzes, in the slot units, information relating to the measured waveform of the signal. A storage section stores the information relating to the measured waveform of the signal which is analyzed in the slot units, as analyzed information of the slot unit. A marker display control section displays a slot marker to designate an arbitrary slot, in correspondence with the measured waveform of the signal which is displayed on the screen. A slot information display control section reads, from the storage section, the analyzed information of the slot unit corresponding to the slot designated by the slot marker displayed on the screen, and displays the analyzed information of the slot unit in correspondence with the slot marker.

18 Claims, 7 Drawing Sheets

U.S. PATENT DOCUMENTS 6,510,140 B1 * 1/2003 Hamada ...................... 370/242
6,615,148 B1 * 9/2003 Pickerd ....................... 702/66
6,784,655 B1 * 8/2004 Saito ....................... 324/121 R
2003/0208330 A1 * 11/2003 Pickerd ....................... 702/80

* cited by examiner

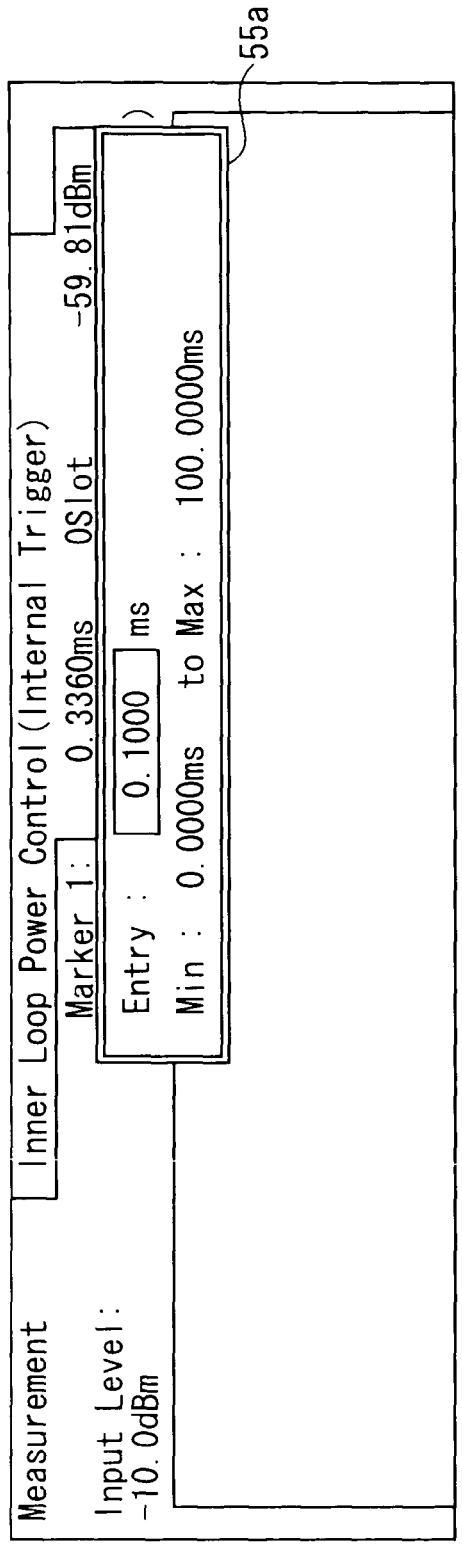
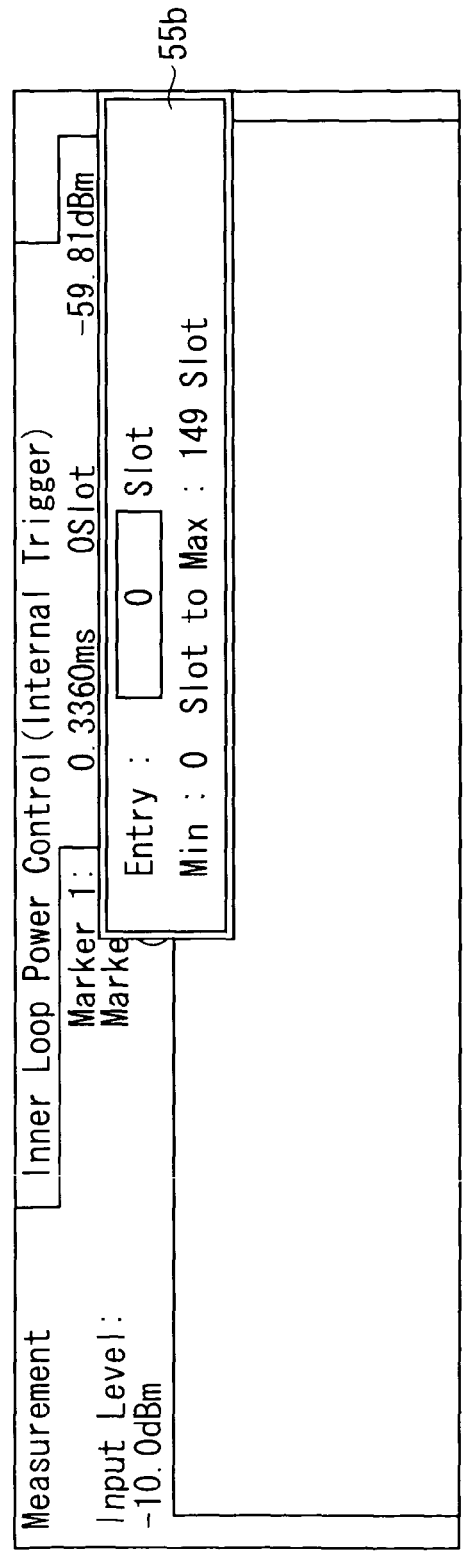
FIG. 3A
FIG. 3B

FIG. 5
| Slot No | Time[ms] | Level[dBm] | Slot(Rel) | Time(Rel)[ms] | Level(Rel)[dB] |
|---|---|---|---|---|---|
| 0 | 0.0000 | −47.63 | −1 | −0.6667 | −1.55 |
| *1 | 0.6667 | −46.08 | 0 | 0 | 0 |
| 2 | 1.3333 | −44.86 | 1 | 0.6666 | 1.22 |
| 3 | 2.0000 | −42.60 | 2 | 1.3333 | 3.48 |
| 4 | 2.6667 | −41.14 | 3 | 2.0000 | 4.94 |
| 5 | 3.3333 | −49.96 | 4 | 2.6666 | 3.88 |
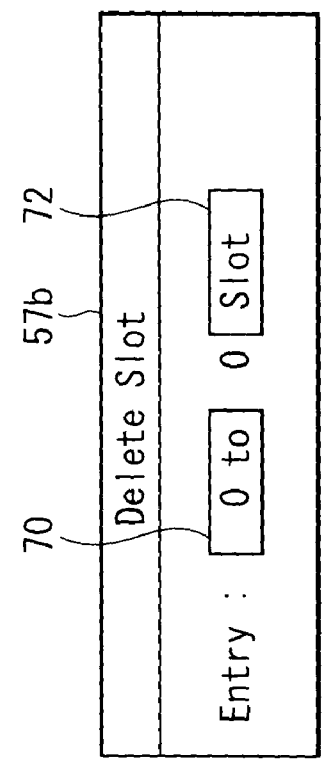
FIG. 6B
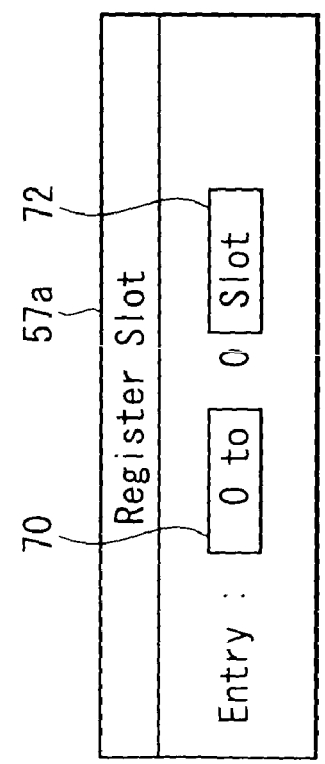
FIG. 6A Active marker 1

Slot marker 1    Slot marker 2

METHOD FOR ANALYZING SIGNAL AND SIGNAL ANALYZER HAVING FUNCTION FOR DISPLAYING SLOT INFORMATION

This application is a U.S. National Phase of International Application No. PCT/JP02/06855 filed on Jul. 5, 2002.

TECHNICAL FIELD

The present invention relates to a signal analyzing method and a signal analyzing device having a slot information display function, and more particular to a signal analyzing method and a signal analyzing device for analyzing, as a signal to be measured, a digital multiplex signal divided into slot units, which is utilized in a mobile communication system such as, for example, mobile cellular phones or the like.

BACKGROUND ART

Generally, a signal analyzing device is known which analyzes, as a signal to be measured, a digital multiplex signal divided into slot units, which is utilized in a mobile communication system such as mobile cellular phones or the like, and which displays the analyzed results in a waveform.

In such a signal analyzing device, due to the analyzed signal being displayed as a waveform on a screen, fluctuations of the waveform of the signal can be grasped. A marker moving on the waveform is set, and the measured numeric value of the position of the waveform designated by the marker can be displayed on the screen.

In this way, in the conventional signal analyzing device, a marker is set for a waveform displayed on a screen, and the measured value of the waveform position designated by the marker can be displayed on the screen.

However, in this case, the marker for designating the position of the waveform is merely moved in units of a moving resolution value for the waveform displayed on a screen determined in advance, namely, in display units (for example, a grid) of the screen on which the waveform is displayed.

Further, with regard to the measured values displayed, only the grid portion corresponding to the position of the waveform designated by the marker is displayed.

Accordingly, in a conventional signal analyzing device, even if information of the measured values of predetermined slot units is necessary for the waveform of the signal to be measured, there is the problem that the information cannot be easily grasped.

DISCLOSURE OF THE INVENTION

The present invention has been achieved in light of the above circumstances, and an object of the present invention is to provide a signal analyzing method in which a digital multiplex signal divided into slot units is measured as a signal to be measured, and is analyzed in slot units, and markers can be designated, in predetermined slot units, for a waveform displayed on a screen displaying the measured results as a waveform, and which has a slot information display function in which analysis results of predetermined slot units can be easily read due to the analyzed information, of each predetermined slot unit designated by the markers, being able to be displayed on a screen.

The present invention has been achieved in light of the above circumstances, and another object of the present invention is to provide a signal analyzing device in which a digital multiplex signal divided into slot units is measured as a signal to be measured, and is analyzed in slot units, and markers can be designated, in predetermined slot units, for a waveform displayed on a screen displaying the measured results as a waveform, and which has a slot information display function in which analysis results of predetermined slot units can be easily read due to the analyzed information, of each predetermined slot unit designated by the markers, being able to be displayed on a screen.

In order achieve the above object, according to a first aspect of the invention, there is provided a signal analyzing method comprising:

measuring a digital multiplex signal divided into slot units as a signal to be measured;

displaying, on a screen, a measured waveform of the signal to be measured;

analyzing, in the slot units, information relating to the measured waveform of the signal to be measured;

storing the information, which relates to the measured waveform of the signal to be measured and which is analyzed in slot units, as analyzed information of the slot unit, in a storage section;

displaying a slot marker to designate an arbitrary slot, in correspondence with the measured waveform of the signal to be measured displayed on the screen; and reading, from the storage section, the analyzed information of the slot unit corresponding to the slot designated by the slot marker displayed on the screen, and displaying the analyzed information of the slot unit in correspondence with the slot marker.

According to a second aspect of the present invention, there is provided a signal analyzing method according to the first aspect, wherein the displaying of the slot marker displays the slot marker so as to be movable on the measured waveform of the signal to be measured displayed on the screen.

According to a third aspect of the present invention, there is provided a signal analyzing method according to the first aspect, wherein the displaying of the analyzed information of the slot unit displays the analyzed information of the slot unit stored in the storage section, so as to be able to be viewed as a list on the screen.

According to a fourth aspect of the present invention, there is provided a signal analyzing method according to the first aspect, wherein the displaying of the slot marker displays a plurality of slot markers to designate a plurality of slots, on the screen.

According to a fifth aspect of the present invention, there is provided a signal analyzing method according to the fourth aspect, wherein the displaying of the slot marker displays the plurality of slot markers, so as to be individually movable on the measured waveform of the signal to be measured displayed on the screen.

According to a sixth aspect of the present invention, there is provided a signal analyzing method according to the fourth aspect, wherein the displaying of the slot marker displays the plurality of slot markers, so as to be synchronized and movable on the measured waveform of the signal to be measured displayed on the screen.

According to a seventh aspect of the present invention, there is provided a signal analyzing method according to the first aspect, wherein the displaying of the analyzed information of the slot unit displays relative information between a reference slot designated in advance and an arbitrary slot designated by the slot marker.

According to an eighth aspect of the present invention, there is provided a signal analyzing method according to the first aspect, wherein the displaying of the slot marker comprises:

setting a display width; and displaying the slot marker with set display width.

According to a ninth aspect of the present invention, there is provided a signal analyzing method according to the first aspect, wherein the displaying of the analyzed information of the slot unit displays an average level of the slot on the measured waveform of the signal to be measured displayed on the screen, on the basis of information of an average level for each slot stored in the storage section as one of the analyzed information of the slot unit.

According to a tenth aspect of the present invention, there is provided a signal analyzing device comprising:

a measuring section which measures a digital multiplex signal divided into slot units as a signal to be measured;

a display control section which displays, on a screen, a measured waveform of the signal to be measured which is measured by the measuring section;

an analyzing section which analyzes, in slot units, information relating to the measured waveform of the signal to be measured which is measured by the measuring section;

a storage section which stores information relating to the measured waveform of the signal to be measured which is analyzed in the slot units by the analyzing section, as analyzed information of the slot unit;

a slot marker display control section which displays a slot marker to designate an arbitrary slot, in correspondence with the measured waveform of the signal to be measured displayed on the screen by the display control section; and a slot information display control section which reads, from the storage section, the analyzed information of the slot unit corresponding to the slot designated by the slot marker displayed on the screen by the slot marker display control section, and displays the analyzed information of the slot unit in correspondence with the slot marker.

According to an eleventh aspect of the present invention, there is provided a signal analyzing device according to the tenth aspect, wherein the slot marker display control section displays the slot marker so as to be movable on the measured waveform of the signal to be measured displayed on the screen.

According to a twelfth aspect of the present invention, there is provided a signal analyzing device according to the tenth aspect, wherein the slot information display control section displays the analyzed information of the slot unit stored in the storage section, so as to be able to be viewed as a list on the screen.

According to a thirteenth aspect of the present invention, there is provided a signal analyzing device according to the tenth aspect, wherein the slot marker display control section displays, on the screen, a plurality of slot markers to designate a plurality of slots.

According to a fourteenth aspect of the present invention, there is provided a signal analyzing device according to the thirteenth aspect, wherein the slot marker display control section displays the plurality of slot markers, so as to be individually movable on the measured waveform of the signal to be measured displayed on the screen.

According to a fifteenth aspect of the present invention, there is provided a signal analyzing device according to the thirteenth aspect, wherein the slot marker display control section displays the plurality of slot markers, so as to be synchronized and movable on the measured waveform of the signal to be measured displayed on the screen.

According to a sixteenth aspect of the present invention, there is provided a signal analyzing device according to the tenth aspect, wherein the slot information display control section displays relative information between a reference slot designated in advance and an arbitrary slot designated by the slot marker.

According to a seventeenth aspect of the present invention, there is provided a signal analyzing device according to the tenth aspect, wherein the slot marker display control section comprises:

a setting section which sets a display width; and a displaying section which displays the slot marker with set display width.

According to an eighteenth aspect of the present invention, there is provided a signal analyzing device according to the tenth aspect, wherein the slot information display control section displays an average level of the slot on the measured waveform of the signal to be measured displayed on the screen, on the basis of information of an average level for each slot stored in the storage section as one of the analyzed information of the slot unit.

According to a nineteenth aspect of the present invention, there is provided a signal analyzing method which receives a digital multiplex signal divided into slot units and displays a waveform corresponding to the signal on a screen, the method comprising:

analyzing information relating to the waveform of the signal in slot units, and storing it as slot information;

displaying a slot marker to designate an arbitrary slot among the slots, in correspondence with the waveform of the signal displayed on the screen; and displaying slot information specified by the slot marker displayed on the screen, from among the stored slot information.

BRIEF DESCRIPTION OF DRAWINGS

FIGS. 3A and 3B are views for explaining examples of windows to be used when the position at which a slot marker must be displayed is directly designated by inputting numeric values, in the signal analyzing device shown in FIG. 1;

FIG. 5 is a view for explaining the details of a slot power list, in the signal analyzing device shown in FIG. 1;

FIGS. 6A and 6B are views for explaining examples of windows to be used when a slot is registered in/deleted from the slot power list, in the signal analyzing device shown in FIG. 1;

BEST MODE FOR CARRYING OUT THE INVENTION

Figure 1:
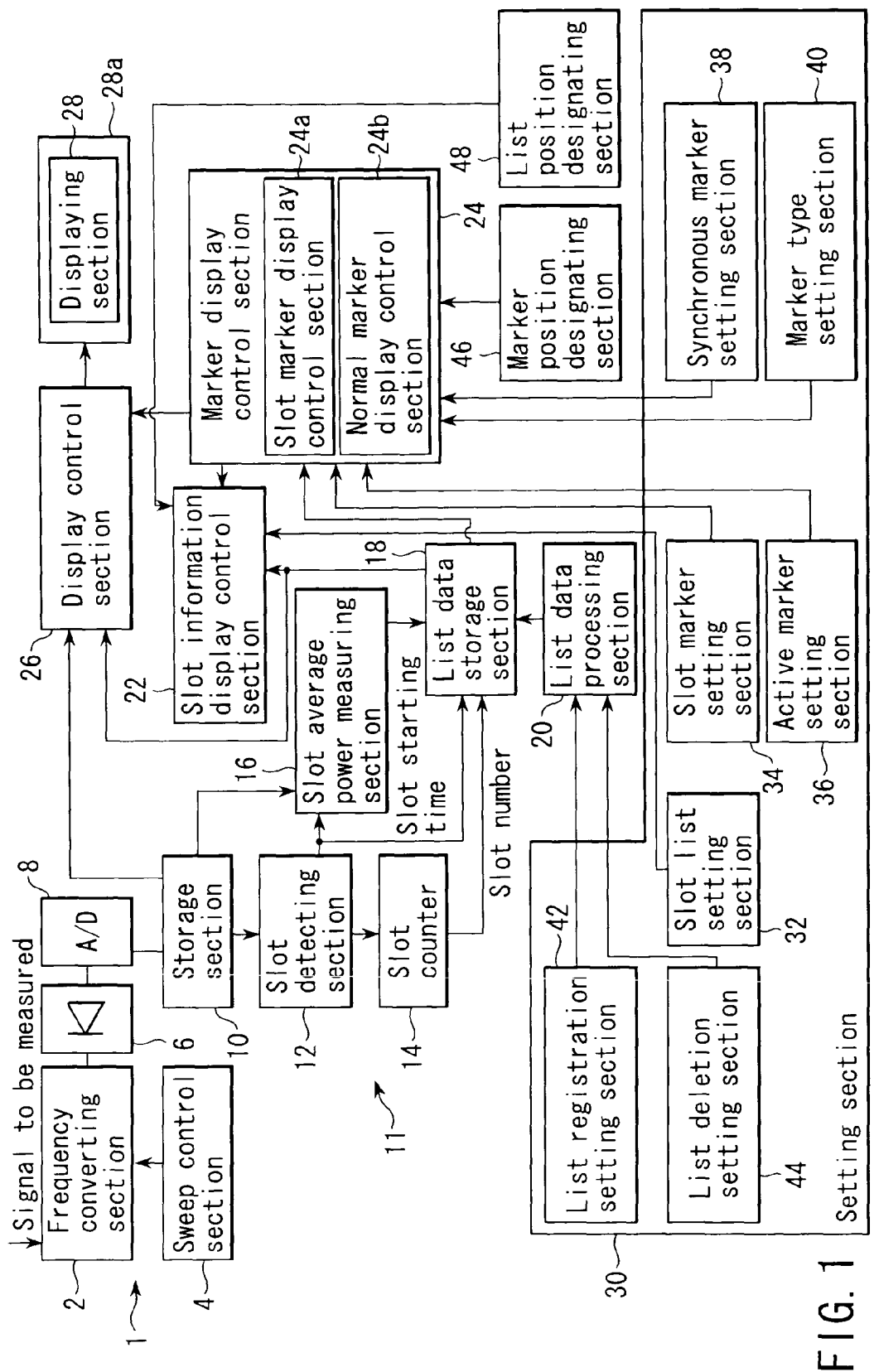
FIG. 1 is a block diagram showing a configuration of a signal analyzing device according to an embodiment of the present invention.

Reference will now be made in detail to the presently preferred embodiments of the invention as illustrated in the accompanying drawings, in which like reference numerals designate like or corresponding parts.

Hereinafter, an embodiment of the present invention will be described with reference to the figures.

FIG. 1 is a block diagram showing a configuration of a signal analyzing device according to the embodiment of the present invention.

As shown in FIG. 1, the signal analyzing device in the present embodiment measures, as a signal to be measured, a digital multiplex signal divided into slot units, which is utilized in a mobile communication system such as, for example, a mobile telephone or the like, at a measuring section 1 and analyzes it at an analyzing section 11, and displays the measured results as a waveform on a screen 28a of a displaying section 28 by a display control section 26. The signal analyzing device enables markers to designated in predetermined slot units by a marker display control section 24 for the waveform displayed on the screen 28, and has a slot information display function which makes it possible to easily read the analyzed results of a predetermined slot unit due to the analyzed information at each predetermined slot unit designated by a marker being able to be displayed on the screen 28 by a slot information display control section 22.

Namely, as shown in FIG. 1, the signal analyzing device in the present embodiment has, as the measuring section 1, a frequency converting section 2, a sweep control section 4, a wave detector 6, an analog/digital (A/D) converter 8, and a storage section 10. The signal analyzing device in the present embodiment also has, as the analyzing section 11, a slot detecting section 12, a slot counter 14, a slot average power measuring section 16, a list data storage section 18, and a list data processing section 20.

Further, in addition to the slot information display control section 22, the marker display control section 24, the display control section 26, and the displaying section 28, the signal analyzing device in the present embodiment has, as a setting section 30, a slot list setting section 38, a slot marker setting section 34, an active marker setting section 36, a synchronous marker setting section 38, a marker type setting section 40, a list registration setting section 42, and a list deletion setting section 44, and also has a marker position designating section 46 and a list position designating section 48.

The frequency converting section 2 in the measuring section 1 carries out frequency conversion by carrying out frequency sweeping, at a predetermined measurement resolution and at a predetermined time by a sweeping signal from the sweep control section 4, for a signal to be measured formed from the inputted digital multiplex signal divided into slot units, and outputs an intermediate frequency signal to the wave detector 6.

Here, the sweep control section 4 outputs, to the frequency converting section 2, a sweeping signal for controlling the measurement resolution and the sweeping time.

Further, the wave detector 6 receives and detects the intermediate frequency signal outputted from the frequency converting section 2, and outputs the detected signal to the A/D converter 8.

The A/D converter 8 converts the analog signal detected by the wave detector 6 to digital data, and outputs it to the storage section 10.

The storage section 10 stores the digital data converted by the A/D converter 8, as a digital signal (waveform data) relating to a signal to be measured.

The slot detecting section 12 in the analyzing section 11 detects slots of constant time intervals in a signal to be measured which is formed from the digital multiplex signal divided into slot units, on the basis of the digital signal (waveform data) stored in the storage section 10.

The slot detecting section 12 outputs the number of the detected slots to the slot counter 14, and notifies the slot average power measuring section 16 of the slot starting time, and makes the data of the slot starting time be stored in the list data storage section 18.

Here, the slot counter 14 counts the slots to be detected by the slot detecting section 12, and the counted value is stored in the list data storage section 18 as a slot number.

Further, the slot average power measuring section 16 measures an average power of the waveform of the slot width with respect to each slot detected by the slot detecting section 12.

Data of the average power of each slot measured by the slot average power measuring section 16 is stored in the list data storage section 18 in correspondence with the slot number counted by the slot counter 14.

Further, the list data storage section 18 stores slot information relating to each slot detected by the slot detecting section 12.

The slot information stored in the list data storage section 18 includes, for each slot, respective data of the slot number, the slot starting time, and the level of the slot average power, and relative data between the slots as well.

Further, in accordance with settings in the registration setting section 42 and the list deletion setting section 44 of the setting section 30, the list data processing section 20 executes registration and deletion of slot information which are objects displayed in a list as a slot power list, among the slot information of the respective slots stored in the list data storage section 18.

Further, when execution of display of a slot power list is set in the slot list setting section 32 of the setting section 30, the slot information display control section 22 carries out control for displaying as a list the slot information of each slot on the basis of the slot information of each slots stored in the list data storage section 18, and carries out display control for displaying the relative information of a reference slot designated in advance and an arbitrarily designated slot on the basis of the slot information of each slot stored in the list data storage section 18.

Further, the marker display control section 24 displays markers for the waveform to be displayed on the screen on the basis of the digital signal (waveform data) stored in the storage section 10, and carries out display control for moving the markers in accordance with instructions from the marker position designating section 46.

The marker display control section 24 executes marker display control in accordance with the settings by the slot marker setting section 34, the active marker setting section 36, the synchronous marker setting section 38, and the marker type setting section 40 in the setting section 30.

The marker display control section 24 is provided with a slot marker display control section 24a in which a band-shaped slot marker having a predetermined width of the slot unit detected by the slot detecting section 12 is displayed and the slot marker is moved in slot units in accordance with designation from the marker position designating section 46, and a normal marker display control section 24*b* in which a normal marker for designating a specific position on the waveform is displayed and is moved in units of a moving resolution value (a grid on a display screen corresponding to a given time) for the waveform displayed on the screen.

Further, the display control section 26 controls the display contents displayed on the screen 28*a* of the displaying section 28. The display control section 26 displays a waveform based on the digital signal (waveform data) positioned in the storage section 10, a list of slot information of each slot display-controlled by the slot information display control section 22 and slot information relating to the slots designated on the waveform by the slot markers, markers display-controlled by the marker display control section 24, and average levels of the slots on the waveform displayed on the screen.

Further, the displaying section 28 displays, on the screen 28*a* thereof, information relating to the measured results and the analyzed results for the signal to be measured, which are display-controlled by the display control section 26.

Note that the setting section 30 is for carrying out various types of settings for the slot information to be displayed by the slot information display control section 22 and the markers to be displayed for the waveform by the marker display control section 24. The setting section 30 includes the slot list setting section 32, the slot marker setting section 34, the active marker setting section 36, the synchronous marker setting section 38, the marker type setting section 40, the list registration setting section 42, and the list deletion setting section 44.

The setting section 30 displays, on the screen, a function menu for carrying out various types of settings or a window for settings, and holds the set contents to be inputted by operation of predetermined keys on a operating panel provided at the device for this display, and controls the respective sections in accordance with the set contents.

Here, the slot list setting section 32 sets whether or not the slot information, corresponding to the waveform displayed on the screen, of the respective slots detected by the slot detecting section 12 is to be displayed as a list.

Further, the slot marker setting section 34 sets whether or not the slot markers are to be displayed for the waveform displayed on the screen, and can set for each of the plurality of markers.

In the present embodiment, two slots markers (slot markers 1, 2) can be displayed on the waveform, and for each of the slot markers, it can be set whether or not the slot marker is to be displayed.

Further, the active marker setting section 36 sets a marker which can be operated to move on the waveform, in accordance with designation from the marker position designating section 46.

Namely, when setting is carried out by the slot marker setting section 34 to display only one slot marker, the slot marker is set as an object to be operated. When setting is carried out to display two slot markers, one of the two slot markers is set as an object to be operated.

Further, when setting is carried out by the slot marker setting section 34 to display two slot markers, the synchronous marker setting section 38 sets, in accordance with a moving operation for a slot marker set as an active marker by the active marker setting section 36, whether or not the slot marker which is not the active marker is to be moved, interlockingly with the active marker, on the waveform.

Further, the marker type setting section 40 sets which of the slot marker or the normal marker is to be displayed on the waveform displayed on the screen.

Further, the list registration setting section 42 carries out setting for registering the slot information, which is an object of list-display as a slot power list, among the slot information of the respective slots stored in the list data storage section 18.

Further, the list deletion setting section 44 carries out setting for deleting the slot information, which is not an object of list-display as a slot power list, among the slot information of the respective slots stored in the list data storage section 18.

Further, the marker position designating section 46 is for designating movement of the position of the displayed marker for the waveform on the screen by the marker display control section 24, and designates, to the marker display control section 24, movement of the position of the marker in accordance with operation of a cursor key or an encoder provided on the operating panel of the device.

The list position designating section 48 is for designating movement of a position in a list to a cursor provided at the slot power list displayed by the display control section 26, and designates, to the slot information display control section 22, movement of the position of the cursor in accordance with operation of a cursor key or an encoder provided on the operating panel (not shown) of the signal analyzing device.

Next, one example of a screen displaying signal analysis results of the signal to be measured in the signal analyzing device shown in FIG. 1, will be described with reference to FIGS. 2, 3A and 3B.

Figure 2:
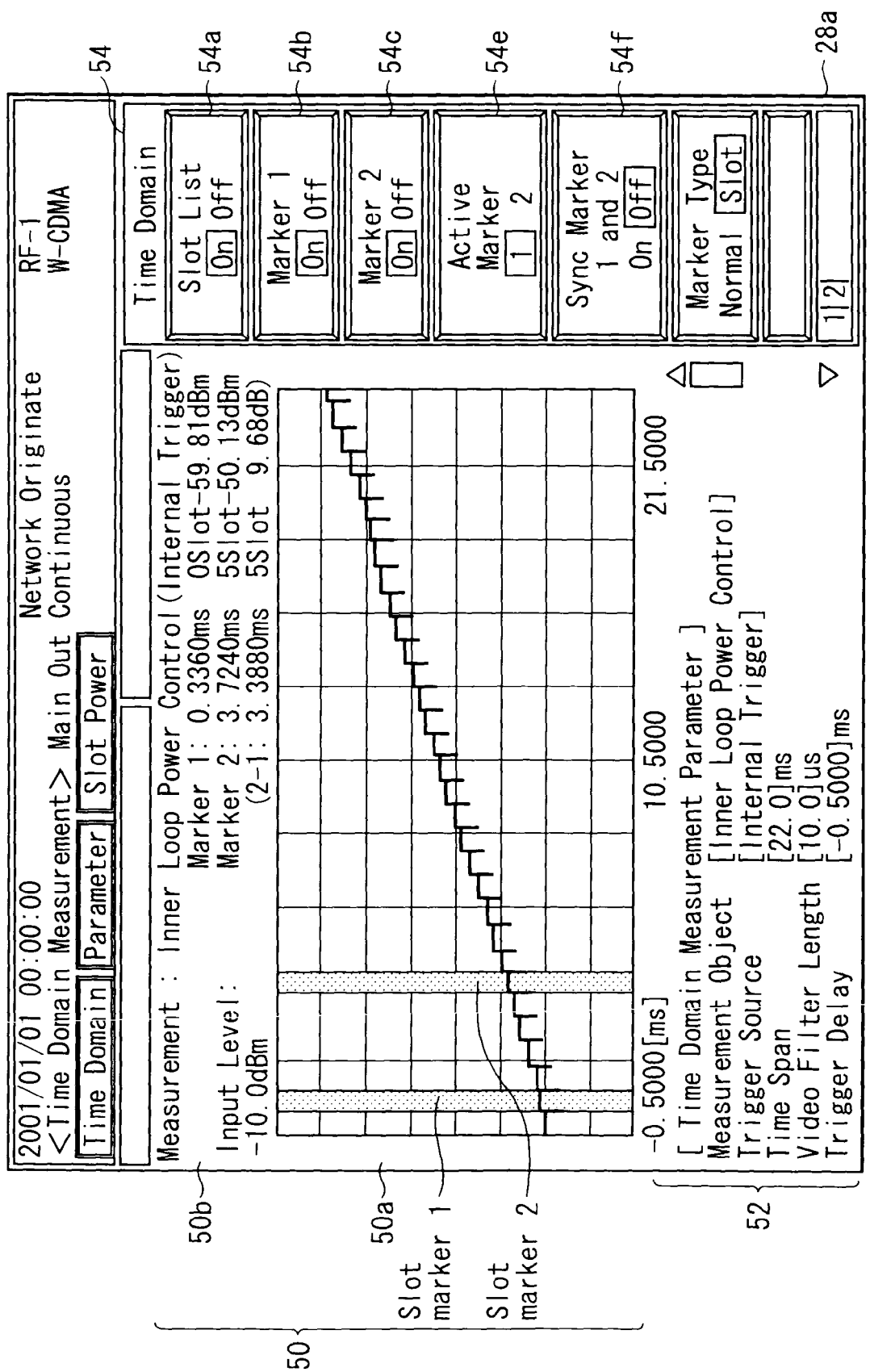
FIG. 2 is a view for explaining one example of a screen on which slot markers are set for a waveform of a signal to be measured, in the signal analyzing device shown in FIG. 1.

FIG. 2 shows one example of a screen in which the slot markers are set for the waveform of the signal.

In the display screen of the signal measuring device displayed in the displaying section 28, a plurality of areas are provided, and information assigned to the respective areas are displayed.

In the example shown in FIG. 2, there is an area provided with windows, such as a measured results display window 50 and a parameter setting window 52, for displaying common functions such as measured results, parameters and the like, and there is a function menu area for displaying a function menu 54 for setting functions on a screen or a window.

Here, a signal waveform based on the digital signal (waveform data) for the signal to be measured which is stored in the storage section 10, is displayed by the display control section 26 in a waveform display region 50*a* of the measured results display window 50.

In this case, in the waveform display region 50*a* of the measured results display window 50 shown in FIG. 2, two slot markers 1, 2 are set.

Further, at the upper portion of the waveform display region 50*a* of the measured results display window 50 in which the signal waveform is displayed, there is provided a measured information display region 50*b* for displaying information of the measured (analyzed) results relating to the slots at the positions shown by the respective slot markers 1, 2 with respect to the waveform.

Note that the function menu 54 includes a plurality of menus 54*a*, 54*b*, . . . , 54*f*, for use in setting in the respective setting sections for controlling the slot information display control section 22 and the marker display control section 24.

The first menu 54*a* is used for setting whether a slot power list is to be displayed or not (on/off) by the slot list setting section 32.

The second and third menus 54b, 54c are used for setting of markers displayed on waveform by the slot marker setting section 34.

The second menu 54b is used for setting of the marker 1, and the third menu 54c is used for setting of the marker 2.

The fourth menu 54d is used for setting, by the active marker setting section 36, of markers which can be operated by a user, and can set either of the marker 1 and the marker 2.

The fifth menu 54e is used for setting whether the two slot markers are to be interlocked or not (on/off) by the synchronous marker setting section 38.

The sixth menu 54f is used for setting which of the slot marker or the normal marker is to be displayed on the waveform by the marker type setting section 40.

Further, due to the function keys provided on the operating panel (not shown) being pushed in accordance with the respective menus of the function menu 54, settings are carried out by the setting sections corresponding to the respective menus.

On the function menu 54 shown in FIG. 2, it is set that the slot power list is to be displayed (on), that the two markers 1, 2 are set (the markers 1, 2 are respectively on), that the active marker is the marker 1, that the markers are to be not synchronized (off), and that the marker type is a slot marker.

Note that the slot information display control section 22, the display control section 26, and the marker display control section 24 execute display-control corresponding to the set contents which are shown in function menu 54 of FIG. 2 and are set by the respective setting sections 32, 34, 36, 38, 40.

Next, operations of the respective sections for displaying the screen shown in FIG. 2 will be described.

Due to the slot markers being set by the marker type setting section 40, the slot marker display control section 24a of the marker display control section 24 displays, for example, the band-shaped (vertical band-shaped) slot markers having substantially the same widths as the slot widths on the waveform of the signal displayed by the display control section 26.

Further, because it is set by the slot marker setting section 34 that two markers are to be displayed, the slot marker display control section 24a displays the two slot markers 1, 2.

The slot marker display control section 24a makes the respective slot markers 1, 2 easily distinguishable for a user, by displaying the respective slot markers 1, 2 in different colors.

Further, in a state that the slot markers 1, 2 are displayed on the waveform as shown in FIG. 2, when movement of the positions of the markers is designated by the marker position designating section 46 due to a cursor key or an encoder on the operating panel being operated, the slot marker display control section 24a makes the slot markers move in slot units of the waveform.

Note that, because the active marker is set to the slot marker 1 by the active marker setting section 36, the slot marker display control section 24a makes the slot marker 1 move in accordance with instructions from the marker position designating section 46.

Further, positions at which the markers must be displayed may be directly designated by inputting values.

For example, in a state that the screen shown in FIG. 2 is displayed, when a predetermined key provided on the operating panel (not shown) is pushed, the marker position designating section 46 displays value inputting windows 55a, 55b, as shown in FIGS. 3A and 3B, for designating a marker position by values.

Here, FIG. 3A shows the value inputting window 55a for a case in which the normal marker is displayed.

Further, FIG. 3B shows the value inputting window 55b for a case in which the slot marker is displayed.

In FIGS. 3A and 3B, the value inputting windows 55a, 55b are provided so as to be close to and beneath items displaying the measured results corresponding to the marker (the marker 1 in FIGS. 3A and 3B) which is the active marker in the measured information display region.

Further, when a normal marker is used, the position of the marker can be designated at an effective resolution unit (time: ms) by the value inputting window 55a.

When a slot marker is used, the position of the marker can be designated in slot units by the value inputting window 55b.

Further, the marker position designating section 46 notifies the marker display control section 24 of the values inputted by the value inputting windows 55a, 55b.

The marker display control section 24 makes the markers move to the positions corresponding to the values notified from the marker position designating section 46.

On the other hand, the slot information display control section 22 judges to which slot positions the slot markers are moved to on the waveform by the marker display control section 24 (the slot marker display control section 24a), with reference to the slot information of the respective slots stored in the list data storage section 18, and reads the slot information of the slots shown by the respective slot markers 1, 2 from the list data storage section 18, and displays it on the measured information display region 50b.

As the display items provided in the measured information display region 50b, there are, for each of the slot markers 1, 2, the starting time of the slot shown by the slot marker, the slot number, and the slot average power level.

Further, as shown in FIG. 2, when the two slot markers 1, 2 are provided, a relative value of the slot between the slot markers 1, 2 is displayed as a display item provided in the measured information display region 50b.

Here, regardless of the state of selection of the active marker, the relative time of the slot marker 2 with respect to the slot marker 1 (2-1), the slot number, and the slot average power level are displayed.

Figure 4:
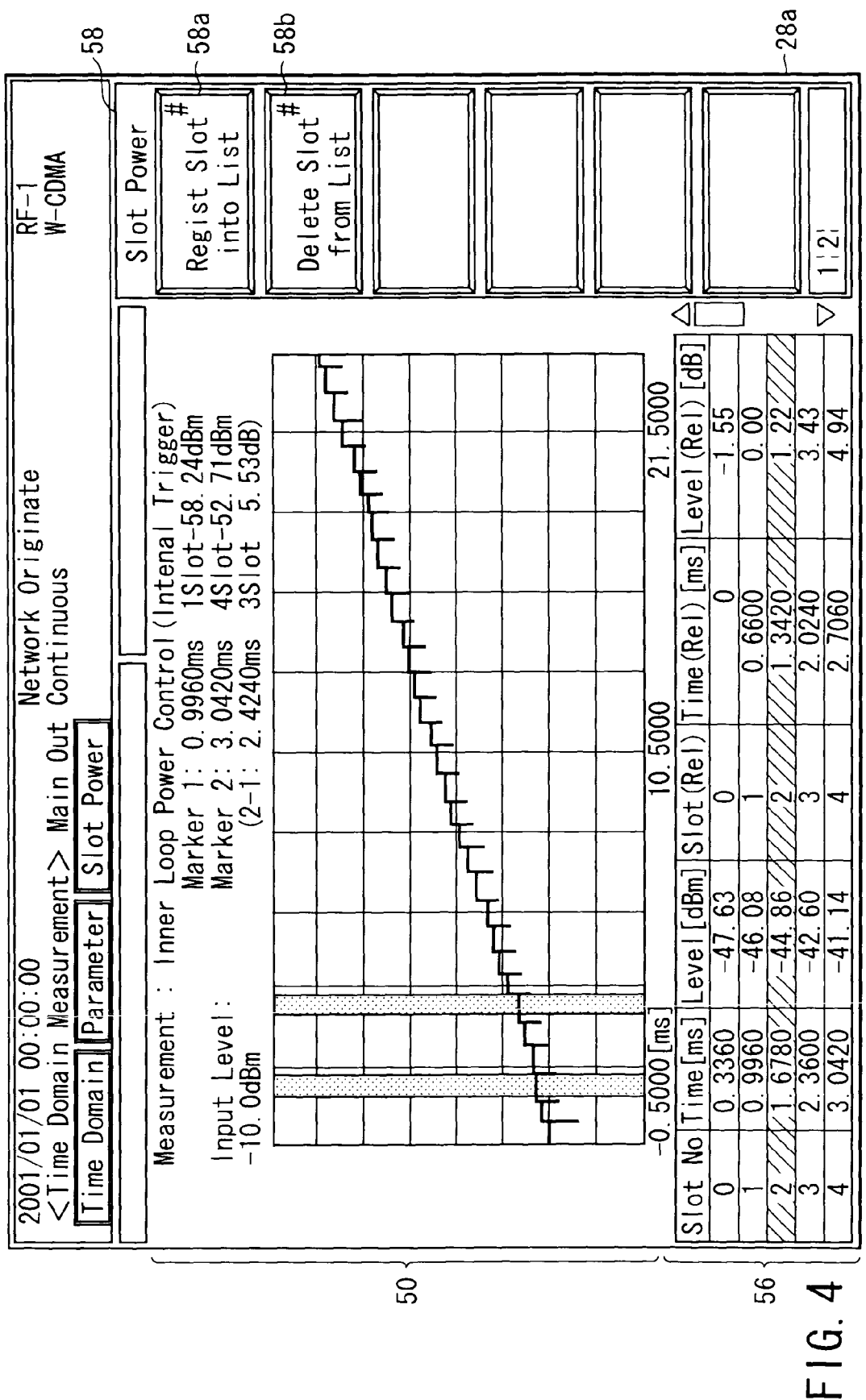
FIG. 4 is a view for explaining one example of a screen on which a list display window, in which slot information of the respective slots are listed in a list, is provided.

FIG. 4 shows one example of the screen 28a which corresponds to the waveform displayed on the measured results display window 50, and which is provided with a list display window 56 on which the slot information of the respective slots are displayed as a list.

Here, when setting is carried out to execute display of the slot power list by the slot list setting section 32, the slot information display control section 22 provides the list display window 56 as shown in FIG. 4 on the screen 28a.

Further, the slot information display control section 22 displays, in the list display window 56, the slot power list prepared on the basis of the slot information of the respective slots stored in the list data storage section 18.

In FIG. 4, the slot power list of the slot numbers 0 through 4 is displayed, and it is shown that a cursor 56h is positioned by applying hatching to the row of the slot number 2.

In this case, the slot power list of the other slot numbers can be displayed by moving the cursor 56h as described later.

FIG. 5 shows the details of the above-described slot power list.

Namely, as shown in FIG. 5, the respective items of a slot number (Slot No) 56*a*, a starting time of the slot (Time: ms) 56*b*, a slot average power level (Level: dBm) 56*c*, a relative slot number with respect to a reference slot (Slot (Rel)) 56*d*, a relative starting time with respect to the reference slot (Time (Rel): ms) 56*e*, and a relative average power level with respect to the reference slot (Level (Rel): dB) 56*f* are provided in the slot power list.

In this case, the slot information display control section 22 registers the slot information (absolute value data) of the respective slots stored in the list data storage section 18, for the respective items of the slot number 56*a*, the starting time of slot 56*b*, and the slot average power level 56*c*.

Further, for the items 56*d*, 56*e*, 56*f* for the reference slot, the slot information display control section 22 calculates and registers data (relative value data) for the respective slots on the basis of the slot information of the reference slot, due to the reference slot being set.

Further, the slot information display control section 22 sets the cursor 56*h* of one line of the list, for the slot power list.

Further, the slot information display control section 22 makes the cursor 56*h* move in units of one line in the list, when moving of the cursor is instructed from the list position designating section 48 in accordance with the operation of a cursor key or the like provided on the operating panel (not shown).

Further, when a selection of the reference slot is instructed by pushing a specific key (a set key, an enter key, an encoder button, or the like) provided on the operation panel (not shown), the slot list setting section 32 sets, as the reference slot, the slot having the slot number where the cursor 56*h* is at that time.

In this way, a reference slot symbol 56*g* (asterisk "*") is displayed at the item of the slot number 56*a* to express that this is the reference slot.

It is assumed that, accompanying the setting of the reference slot, the relative value data for the respective slots are calculated and registered into the slot power list by the slot information display control section 22.

In this way, due to execution of display of the slot power list being set, the slot information of the respective slots of a signal, whose waveform is an object to be displayed in the signal waveform display region, can be displayed as a list in the slot power list.

In this way, a user can instantaneously grasp the measured results of a signal to be measured, for each slot unit.

Further, due to an arbitrary slot being set as the reference slot, and due to information for the respective slots relative to the reference slot also being displayed on the slot power list, the user can grasp that.

Next, a case in which the slot displayed in the slot power list is arbitrarily registered or deleted will be described.

In the function menu area of the display screen 28*a* shown in FIG. 4, the function menu 58, including a menu 58*a* for registering the slot information in the list displayed on the list display window 56 and a menu 58*b* for deleting the slot information from the list, is displayed by the list registration setting section 42.

When a function key (not shown) corresponding to the menu 58*a* of the function menu 58 is pushed, the list registration setting section 42 makes a window for registration 57*a*, as shown in FIG. 6A, for registering the slot in the slot power list be displayed in the screen 28*a*.

A start point slot number inputting column 70 and an end point slot number inputting column 72, for designating the range of the slot which is an object to be registered, are provided in the window for registration 57*a*.

Further, when values are respectively inputted in the start point slot number inputting column 70 and the end point slot number inputting column 72 by operating number keys or the like provided on the operating panel (not shown), the list registration setting section 42 registers, in the slot power list, all of the slots between the two slots shown by the values, such that these slots are objects to be displayed.

In the same way, when a function key (not shown) corresponding to the menu 58*b* of the function menu 58 is pushed, the list registration setting section 42 makes a window for deletion 57*b*, as shown in FIG. 6B, for deleting the slot from the slot power list be displayed on the screen 28*a*.

The start point slot number inputting column 70 and end point slot number inputting column 72, for designating the range of the slot which is an object to be deleted, are provided in the window for deletion 57*b*.

Further, when values are respectively inputted in the start point slot number inputting column 70 and the end point slot number inputting column 72 by operating number keys or the like provided on the operating panel (not shown), the list deletion setting section 44 deletes, from the slot power list, all of the slots between the two slots shown by the values.

In this way, a slot registered in the slot power list can be arbitrarily registered/deleted, and the slot power list can be used in accordance with the purpose of the user, such as, when the slot information is to be displayed as a list by the slot power list, only the slot information relating to the slot of interest is displayed.

Next, a case in which the two slot markers 1, 2 are set to be synchronized by the synchronous marker setting section 38, will be described with reference to FIGS. 7A, 7B and 7C.

Figure 7A:
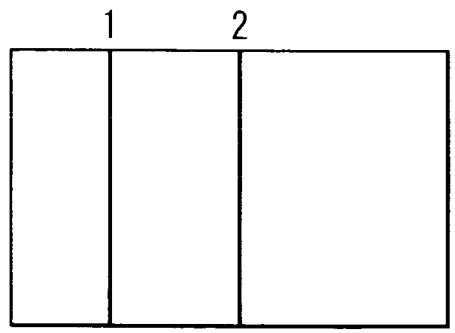
FIGS. 7A, 7B, and 7C are diagrams for explaining a case in which setting is carried out to synchronize two slot markers 1, 2 by a synchronous marker setting section 38, in the signal analyzing device shown in FIG. 1.
Figure 7B:
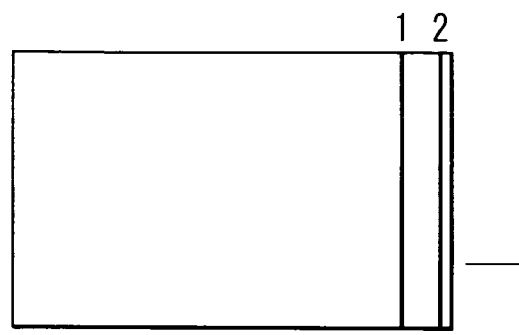
Figure 7C:
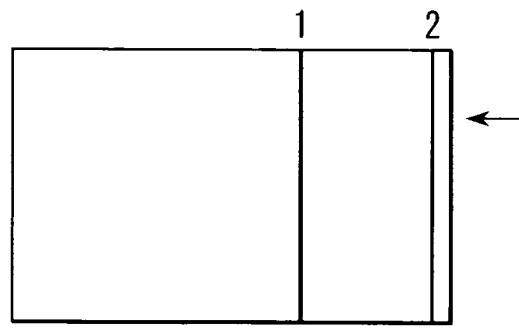

In FIGS. 7A, 7B and 7C, only the signal waveform display region is shown.

In FIG. 7A, it is assumed that, when the slot marker 1 is set as an active marker, there is an instruction to move the active marker (slot marker 1) to the right.

In accordance with this instruction, the slot marker display control section 24*a* makes the slot marker 1 move to the right, and makes the slot marker 2 move interlockingly to the right while keeping the space between the slot marker 1 and the slot marker 2 the same.

Further, when the slot marker 2 is made to move interlockingly in this way, in a case where the slot marker 2 goes out of the signal waveform display region, as shown in FIG. 7B, the slot marker 2 is attached to the end of the signal waveform display region (the position is fixed to the end portion), and displayed.

Note that, it is supposed that the active marker (slot marker 1) can be moved in the signal waveform display region even in a state that the slot marker 2 is attached to the end portion of the region.

Further, in the state that the slot marker 2 is attached to the end portion of the region, when the active marker (slot marker 1) is made to move to the left and the interval between the slot marker 1 and the slot marker 2 returns to the original interval, the slot marker display control section 24*a* makes the two slot markers 1, 2 move interlockingly again.

On the other hand, when the slot markers 1, 2 are made to move interlockingly by the slot marker display control section 24*a*, in accordance with this movement, the slot information display control section 22 successively displays, in the measured results display region, the slot information of the slots respectively shown by the slot markers 1, 2.

Further, the slot information display control section 22 displays the relative value data of the slot shown by the slot marker 2 with respect to the slot shown by the slot marker 1.

In this way, due to the two slot markers 1, 2 being moved interlockingly, and due to the respective information of the slots shown by the slot markers 1, 2 being displayed, the user can continuously and easily grasp the slot information and the relative value data of the respective slots in a predetermined slot interval.

Next, a case in which an average level per slot is displayed on the waveform displayed in the signal waveform display region will be described with reference to FIG. 8.

Figure 8:
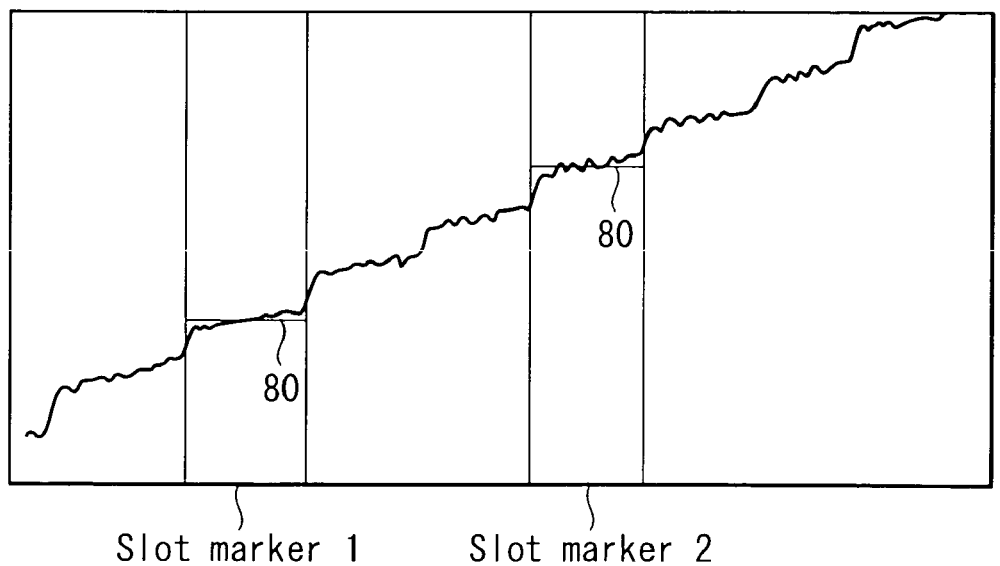
FIG. 8 is a graph for explaining a case in which an average level of each slot is displayed on a waveform displayed in a signal waveform display region, in the signal analyzing device shown in FIG. 1.

The display control section 26 displays, as shown in FIG. 8, a display expressing an average level of the slot on the signal waveform (average level display 80), on the basis of the information of the slot average power of the respective slots stored in the list data storage section 18.

Note that, in FIG. 8, the average level display 80 is displayed for only the slots whose positions are designated by the slot markers 1, 2. However, the average level may be displayed for all of the slots together with the waveform, regardless of the designations by the slot markers 1, 2.

Whether or not the average level display 80 is to be added to the waveform display by the display control section 26 can be arbitrarily set by the function menu or the like.

The display control section 26 refers to the setting contents, and executes the display as shown in FIG. 8 when the average level display 80 is set to be added to the waveform display.

In this way, due to the average level being displayed on the waveform, the user can easily grasp the changes in the signal waveform.

Note that, in the above description, the slot marker has a width corresponding to one slot for the waveform of the signal, and is made move in units of one slot. However, the width of the slot marker may be arbitrarily changed.

For example, a window for setting a slot width is displayed, and a slot marker corresponding to the width designated in the window, for example, a width of a plurality of slots, is set.

The slot marker display control section 24a may make a slot marker having a width of a plurality of slots move in units of the slot marker width or in units of one slot, in accordance with instruction from the marker position designating section 46.

At this time, the slot information display control section 22 may calculate and display the measured results of a plurality of slots within a range shown by a broad slot marker which is display-controlled by the slot marker display control section 24a, on the basis of the slot information of the respective slots registered in the list data storage section 18.

Note that it is possible to designate the width of the slot marker by a setting other than a setting in which the width of the slot marker is the width of a plurality of slots.

Further, in the signal analyzing device, it is possible to provide a function for changing a measuring time of the signal waveform displayed in the signal waveform display region of the measured results display window 50.

Further, when the measuring time of the signal waveform is changed for the signal waveform display region, a display pitch of the waveform in the screen is also changed.

Accordingly, in accordance with the change in the measuring time of the signal waveform, the slot marker display control section 24a changes the width of the slot marker displayed on the waveform in accordance with the slot width of the waveform after the change. When the display position of the slot marker is changed in accordance with instruction from the marker position designating section 46, the slot marker display control section 24a makes the display position of the slot marker move in units of the slot width after the change.

Note that, on the screen, the measured data of a time span (a trigger span is a display unit on the screen, and, in actuality, is determined on the basis of a triggered time, so as to be in equilibrium with a delay time) is displayed. The width of the slot marker is interlocked with the setting of the time span.

Namely, in the embodiment described above, it is supposed that the width of the slot marker and the moving unit (dot) of the slot marker are determined in accordance with the change in the setting of the time span.

Further, in the above description, although a case is described in which two slot markers can be set, three slot markers or more can be set.

In this case, slots are designated by a combination of arbitrary slot markers, and the measured results between the slots may be displayed in the measured results display region.

Second Embodiment

Next, a second embodiment, which is configured such that a width of a slot marker and a moving unit (dot) of the slot marker are determined in accordance with the change in the setting of the time span described above, will be described with reference to FIG. 9.

Figure 9:
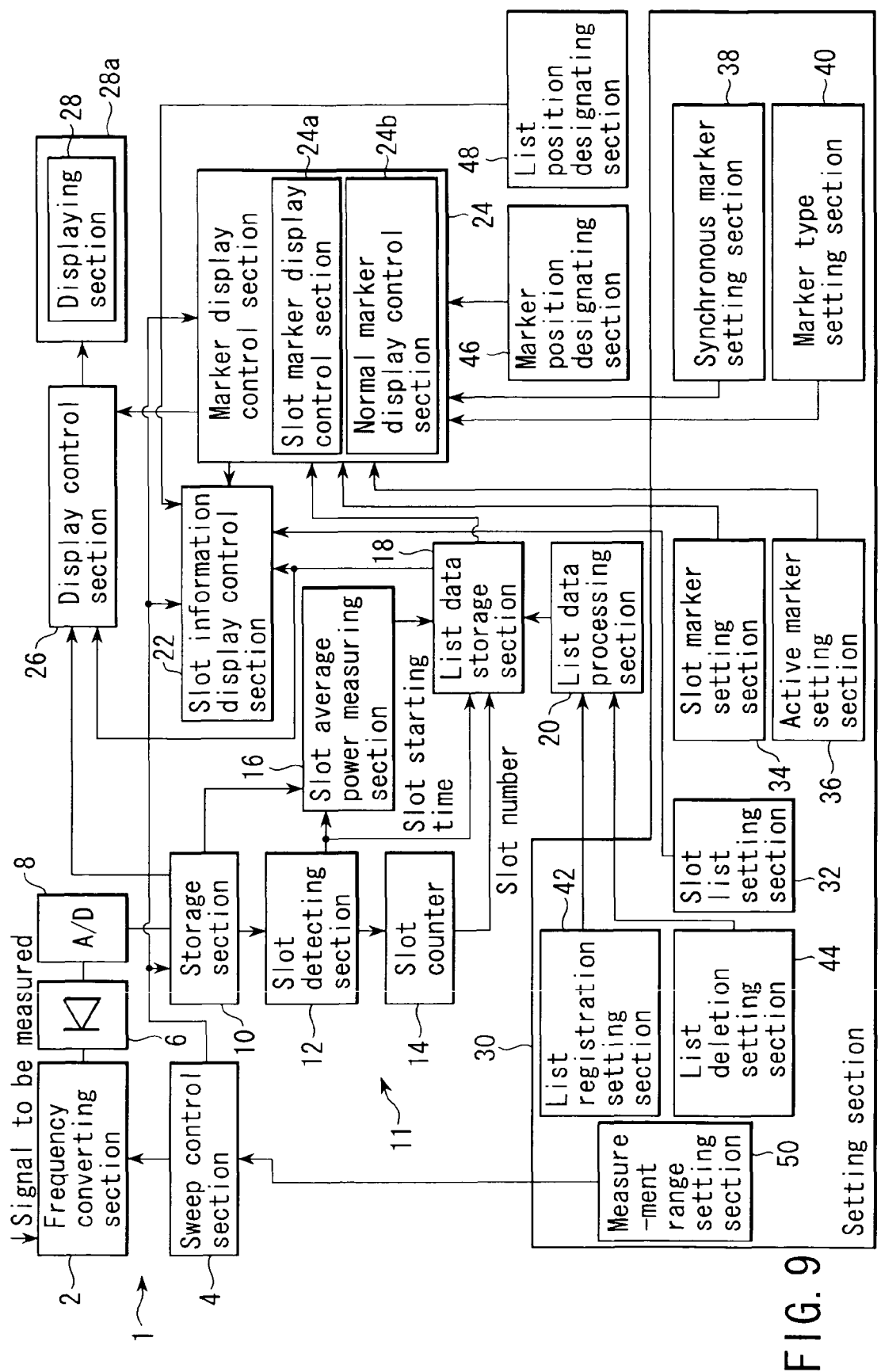
FIG. 9 is a block diagram showing a configuration of a signal analyzing device according to a second embodiment of the present invention.

FIG. 9 is a block diagram showing a configuration of a signal analyzing device according to a second embodiment of the present invention.

In FIG. 9, explanation of parts which are configured in the same way as in FIG. 1 of the first embodiment described above will be omitted, and only different parts will be described.

Namely, in FIG. 9, a measurement range setting section 50 is newly provided in the setting section 30.

A measurement range setting signal from the measurement range setting section 50 is supplied to the sweep control section 4.

Further, the sweep control section 4 supplies a sweep control signal to the frequency converting section 2 as described above, and newly supplies information expressing a measurement range to the storage section 10, the slot information display control section 22 and the marker display control section 24.

Next, description will be given of operations in which the width of the slot marker and the moving unit (dot) of the slot marker are determined in accordance with the change in the setting of the time span described above, in the signal analyzing device according to the second embodiment structured as described above.

First, a desired measurement range is set, with time or frequency serving as the parameter, by the measurement range setting section 50.

The sweep control section 4, to which a sweep control signal for setting a desired measurement range is supplied from the measurement range setting section 50, outputs to the frequency converting section 2 a sweeping signal for sweeping the desired measurement range set at the measurement range setting section 50.

The frequency converting section 2 at the measuring section 1 receives a signal to be measured which is formed from the inputted digital multiplex signal divided into slot units.

Furthermore, the sweep control section 4 simultaneously supplies information expressing the measurement range to the storage section 10, the slot information display control section 22 and the marker display control section 24.

The storage section 10 and the slot information display control section 22 utilize the information expressing the measurement range as address information when the digital data converted by the A/D converter 8 is stored as a digital signal (waveform data) for a signal to be measured and the slot information of the signal to be measured is displayed.

In addition, the marker display control section 24 receives information expressing the width of the slot maker and the width of the moving step of the slot marker from the slot marker setting section 34 and information expressing the desired measurement range from the sweep control section 4, and determines the width of the slot maker and the width of the moving step of the slot marker on the display to display them on the screen 28a of the displaying section 28 via the display control section 26.

In accordance therewith, even if a sweeping width which is, for example, from −0.5 ms to −21.5 ms in FIG. 4 is displayed in an enlarged manner at from 10.5 ms to 21.5 ms as the measurement range, at the measurement range setting section 50, the width of the slot maker and the width of the moving step of the slot marker can be automatically linked with one another and can be displayed in an enlarged manner.

Note that, the method described in the above-described embodiment can be provided to various devices as a program which can be executed by a computer, by being written on a recording medium such as, for example, a magnetic disk (flexible disk, hard disk, or the like), an optical disk (CD-ROM, DVD, or the like), a semiconductor memory or the like, and can be provided for various types of devices by being transmitted by a communication medium.

A computer realizing the method described in the present embodiment reads the program stored on a recording medium, or receives the program via a communication medium, and executes the various types of processings described above due to the operation thereof being controlled by the program.

As described above in detail, in accordance with the present invention, by the slot markers, designation is possible for each of predetermined intervals with respect to the waveform displayed on the screen, and due to information of the measured value for each predetermined interval being able to be displayed, the signal analysis results can be easily read.

Accordingly, as described above in detail, in accordance with the present invention, there is provided a signal analyzing method in which a digital multiplex signal divided into slot units is analyzed as a signal to be measured, and markers can be designated, in slot units, for a waveform displayed on a screen displaying the analyzed results as a waveform, and which has a slot information display function in which signal analysis results of predetermined slot units can be easily read due to the analyzed information being able to be displayed on a screen in predetermined slot units.

Further, in accordance with the present invention, there is provided a signal analyzing device in which a digital multiplex signal divided into slot units is analyzed as a signal to be measured, and markers can be designated, in predetermined slot units, for a waveform displayed on a screen displaying the analyzed results as a waveform, and which has a slot information displaying function in which the signal analysis results of predetermined slot units can be easily read due to the analyzed information being able to be displayed on a screen in predetermined slot units.

The invention claimed is:

1. A signal analyzing method comprising:
    detecting a digital multiplex signal divided into slot units, which is utilized in a mobile communication system, as a signal to be measured;
    storing the detected signal to be measured;
    displaying, on a screen, a measured waveform of the stored signal to be measured;
    detecting a slot of a fixed time interval from the stored signal to be measured;
    analyzing, in the slot units, information relating to the measured waveform of the stored signal to be measured based on the detected slot;
    storing, in a storage section, the analyzed information relating to the measured waveform of the signal to be measured, as analyzed information of the slot unit;
    displaying a slot marker to designate an arbitrary slot, in correspondence with the measured waveform of the signal to be measured displayed on the screen; and
    reading, from the storage section, the analyzed information of the slot unit corresponding to the slot designated by the slot marker displayed on the screen, and displaying the analyzed information of the slot unit in correspondence with the slot marker.

2. The signal analyzing method according to claim 1, wherein the displayed slot marker is displayed so as to be movable on the measured waveform of the signal to be measured displayed on the screen.

3. The signal analyzing method according to claim 1, wherein the displayed analyzed information of the slot unit is displayed so as to be able to be viewed as a list on the screen.

4. The signal analyzing method according to claim 1, wherein the displaying of the slot marker includes displaying a plurality of slot markers on the screen to designate a plurality of slots.

5. The signal analyzing method according to claim 4, wherein the plurality of slot markers are displayed so as to be individually movable on the measured waveform of the signal to be measured displayed on the screen.

6. The signal analyzing method according to claim 4, wherein the plurality of slot markers are displayed so as to be synchronized and movable on the measured waveform of the signal to be measured displayed on the screen.

7. The signal analyzing method according to claim 1, wherein the displaying of the analyzed information of the slot unit includes displaying relative information between a reference slot designated in advance and the arbitrary slot designated by the slot marker.

8. The signal analyzing method according to claim 1, wherein the displaying of the slot marker comprises:
    setting a display width; and
    displaying the slot marker with the set display width.

9. The signal analyzing method according to claim 1, wherein the displaying of the analyzed information of the slot unit includes displaying an average level of the slot on the measured waveform of the signal to be measured displayed on the screen, on the basis of information of an average level for each slot stored in the storage section as one of the analyzed information of the slot unit.

10. A signal analyzing device comprising:
- a measuring section which detects a digital multiplex signal divided into slot units, which is utilized in a mobile communication system, as a signal to be measured, and which stores the detected signal to be measured;
- a display control section which displays, on a screen, a measured waveform of the stored signal to be measured which is detected by the measuring section;
- an analyzing section which detects a slot of a fixed time interval from the stored signal to be measured by the measuring section, and analyzes, in slot units, information relating to the measured waveform of the stored signal to be measured based on the detected slot;
- a storage section which stores the analyzed information relating to the measured waveform of the signal to be measured, as analyzed information of the slot unit;
- a slot marker display control section which displays a slot marker to designate an arbitrary slot, in correspondence with the measured waveform of the signal to be measured displayed on the screen by the display control section; and
- a slot information display control section which reads, from the storage section, the analyzed information of the slot unit corresponding to the slot designated by the slot marker displayed on the screen by the slot marker display control section, and which displays the analyzed information of the slot unit in correspondence with the slot marker.

11. The signal analyzing device according to claim 10, wherein the slot marker display control section displays the slot marker so as to be movable on the measured waveform of the signal to be measured displayed on the screen.

12. The signal analyzing device according to claim 10, wherein the slot information display control section displays the analyzed information of the slot unit stored in the storage section, so as to be able to be viewed as a list on the screen.

13. The signal analyzing device according to claim 10, wherein the slot marker display control section displays, on the screen, a plurality of slot markers to designate a plurality of slots.

14. The signal analyzing device according to claim 13, wherein the slot marker display control section displays the plurality of slot markers, so as to be individually movable on the measured waveform of the signal to be measured displayed on the screen.

15. The signal analyzing device according to claim 13, wherein the slot marker display control section displays the plurality of slot markers, so as to be synchronized and movable on the measured waveform of the signal to be measured displayed on the screen.

16. The signal analyzing device according to claim 10, wherein the slot information display control section displays relative information between a reference slot designated in advance and the arbitrary slot designated by the slot marker.

17. The signal analyzing device according to claim 10, wherein the slot marker display control section comprises:
- a setting section which sets a display width; and
- a displaying section which displays the slot marker with the set display width.

18. The signal analyzing device according to claim 10, wherein the slot information display control section displays an average level of the slot on the measured waveform of the signal to be measured displayed on the screen, on the basis of information of an average level for each slot stored in the storage section as one of the analyzed information of the slot unit.

* * * * *